March 19, 1935.  E. GEISSBÜHLER  1,995,206

CLAMP

Filed July 27, 1932

Inventor
E. Geissbühler
by Freeman and Albrecht
Attorneys

Patented Mar. 19, 1935

1,995,206

UNITED STATES PATENT OFFICE 1,995,206

CLAMP

Ernst Geissbühler, Schlieren-Zurich, Switzerland

Application July 27, 1932, Serial No. 625,046
In Switzerland December 11, 1931

4 Claims. (Cl. 90—59)

This invention relates to clamps, and more particularly to machinist's work clamps, used, for example, to clamp work to the table of a machine tool which may be any one of a number of kinds of machine tools such as a planer, shaper, and so forth.

The most usual way of clamping a piece of work to a planer table is to build up on the table blocking to a height equal to that part of the work where the clamping pressure is to be applied, and then provide a bridge, of bar stock, extending from the blocking to the work. The bridge thus formed is then clamped down against the work in any suitable manner as by means of a bolt and nut, the bolt having a head engaging a T-slot in the planer table.

It is necessary in the usual prior clamp to block up the bridge or yoke so that it is horizontal, and that necessitates that for different heights of work a large collection of blocks must be on hand. Moreover it will usually be necessary to use more than one block for the reason that it is impossible to keep enough blocks of different sizes on hand so that the bridge may be blocked up to exactly the horizontal position with but one block. Sometimes shims of sheet metal may be required, but due to irregularities, they may yield to the clamping pressure.

Good positive clamping is therefore difficult to secure. This is moreover true even if the yoke is blocked up so as to be horizontal, for the reason that the yoke is usually made of bar stock which is apt to bend to a certain extent.

Moreover selecting the blocks and building up the blocking for one end of the yoke is a time-consuming proposition. Obviously the parts of the clamping means are in this method of clamping all separate and really do not constitute a clamp until the height of the work is determined and the parts of the clamp then selected, built up, and assembled.

Another disadvantage of the hereinbefore described method of clamping is the liability of the development of components of force acting in a plane substantially parallel to the table of the machine tool. Such components may arise due to a variety of causes such as for example unequal distances above the table of the respective ends of the yoke of the clamp, bending of the yoke, etc. Such unbalanced force components may tend to tilt the work or slide the work upon the table. It must also be remembered that the work is under a tremendous strain when a tool is taking a heavy cut therefrom. Any such tendencies for the work to tilt or slide will be accentuated when the cutting tool is operating upon the work.

Furthermore any slipping tendency as between the work and the yoke of the clamp will tend to mar the work and also the planer table.

One of the objects of the invention is to provide a clamp which is adjustable over a wide range and more particularly adjustable to an infinite number of clamping positions within said range.

Another object is to provide a clamp in which there is even distribution of load with no force components in a plane substantially parallel to the work table, and more specifically no tendency for the clamp to slip on the work nor to cause slipping or tilting of the work.

Still another object is the provision of a clamp in which bending is minimized and more specifically in which the yoke of the clamp is formed as a beam of uniform rigidity.

A further object is the provision of an adjustable clamp in which the parts are all assembled and may remain assembled even when the clamp is not in use.

Another object of the invention is to provide a clamp which avoids the disadvantages of the usual machinist's clamp as hereinbefore set forth, while securing positive clamping for every position within the range of adjustment of the clamp. Other objects will appear hereinafter as the description of the invention proceeds.

The novel features of the invention will appear from this specification and the accompanying drawing forming part thereof and showing one embodiment of the invention, and all these novel features are intended to be pointed out in the claims.

In the drawing, Fig. 1 is a sectional elevation of a clamp embodying the invention, shown in its relation to a work table and the work thereon, the table and the work being shown fragmentarily.

Figures 1, 2:
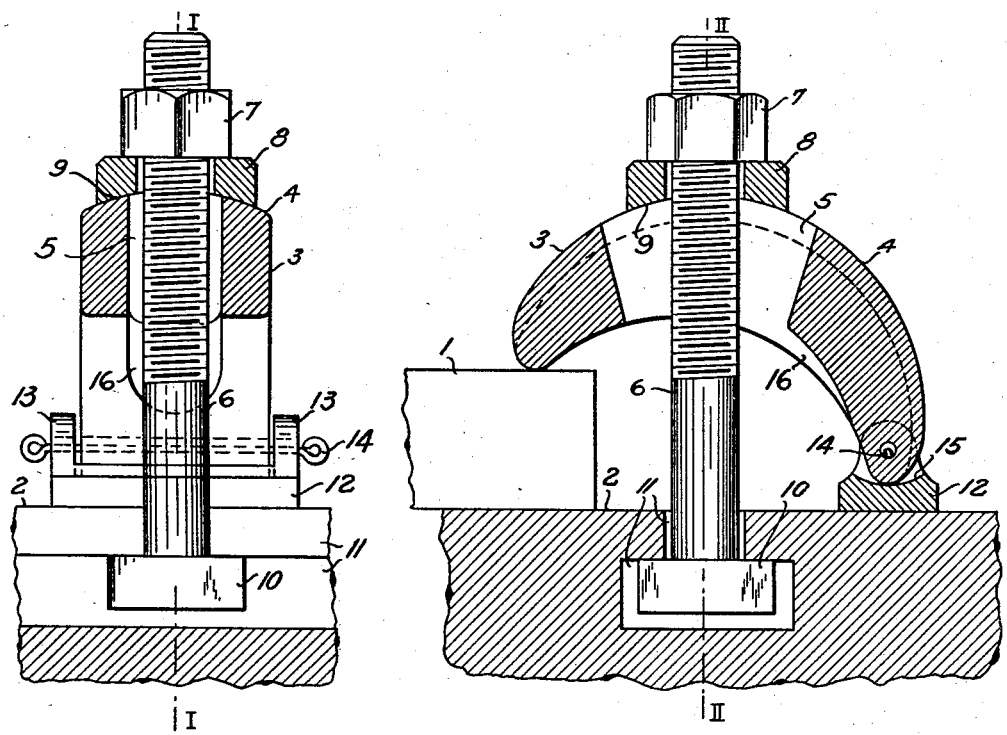
Fig. 2 is a section along the line II—II of Fig. 1.
Figure 3:
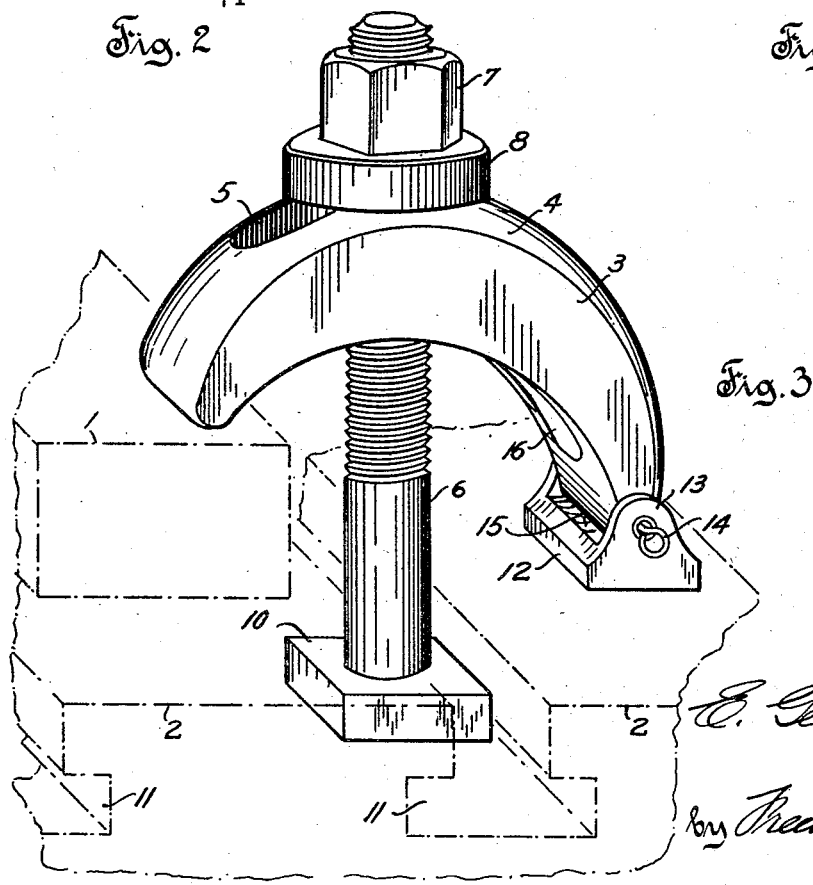
Fig. 3 is a perspective view of a clamp embodying the invention, a work table and work being indicated fragmentarily in dot and dash lines.

Referring to Fig. 1 of the drawing, a work piece 1 is indicated as on a table 2. The work piece 1 is held to the table by positive clamping action of a bridge or yoke 3. The outer surface 4 of the yoke 3 is arcuate and may be substantially semicircular longitudinally. Transversely the surface 4 is also arcuate as shown in Fig. 2 (see also Fig. 3). Thus, at least a portion of the surface 4 is preferably made spherical.

The yoke is provided with a longitudinal slot 5 through which a bolt 6 is adapted to pass. The threaded end of the bolt is provided with a nut 7. Between the nut 7 and the surface 4 of the yoke 3 a washer 8 is interposed.

The surface 9 of the washer 8 which cooperates with the surface 4 of the yoke is of concavo-spherical form, so that the washer 8 may be well seated when the nut 7 is drawn up. It is clear of course that only that portion of the surface 4 which cooperates with washer 8 need be made spherical.

The bolt 6 is provided with a square head 10 which is adapted to be disposed in a T-slot 11 in the table 2. As is usual the table 2 of the machine tool 7 may have a number of parallel T-slots (only one of which is shown) so that work of different sizes may be accommodated.

The inner surface of the yoke 3 is here shown as also arcuate longitudinally, but not transversely. The said inner surface is provided with a recess or channel 16, and the entire yoke is preferably, though not essentially, so designed that the yoke acts like a beam of uniform rigidity under its concentrated load.

One end of the yoke 3 is here shown as having swingably mounted thereon a shoe 12. The shoe 12 is provided with flanges 13 which have holes registering with a hole passing through the end of the yoke. Through these registering holes passes a pintle 14 which may be of wire with looped ends, as shown, to prevent the wire from falling out. The shoe 12 is provided with a seat 15 against which the cooperating end of the yoke 3 is adapted to bear when the clamp is in the clamping position as shown in Fig. 1. If desired the other end of the yoke might be provided with a shoe such as 12.

The end portions of the yoke 3 may, where they are adapted to contact with the seat 15 and with the work respectively, be made cylindrical, or more generally, a surface having a straight line generatrix.

It should be understood that it is not desired to limit the invention to the exact details of construction shown and described, for various modifications may occur to persons skilled in the art.

I claim:

1. Clamping means for clamping articles to a support, comprising: a tension bolt having one end operatively connectible to said support; a bridge, having ends for bearing against articles to be clamped to said support; said bridge having a longitudinally elongated slot, said bolt passing through said slot; a nut for the other end of said bolt; and spacing means between said nut and bridge; said spacing means having abutment surfaces engaging complementary surfaces on said nut and bridge respectively; the surface engaging said bridge being concavo-spherical, and the complementary surface on said bridge fitting said spacing means being a single convexo-spherical surface coextensive with the range of adjustment of said bolt along said slot.

2. Clamping means for clamping articles to a support, comprising: a tension bolt having one end operatively connectible to said support; a bridge, having ends for bearing against articles to be clamped to said support; said bridge having a longitudinally elongated slot, said bolt passing through said slot; a nut for the other end of said bolt; and spacing means between said nut and bridge; said spacing means having abutment surfaces engaging complementary surfaces on said nut and bridge respectively; the surface engaging said bridge being concavo-spherical, and the complementary surface on said bridge fitting said spacing means being a single convexo-spherical surface coextensive with the range of adjustment of said bolt along said slot; the radius of curvature of said spherical surface being approximately one-half of the span of said bridge.

3. Clamping means for clamping articles to a support, comprising: a tension bolt having one end operatively connectible to said support; a bridge, having ends for bearing against articles to be clamped to said support; said bridge having a longitudinally elongated slot, said bolt passing through said slot; a nut for the other end of said bolt; and spacing means between said nut and bridge; said spacing means having abutment surfaces engaging complementary surfaces on said nut and bridge respectively; the surface engaging said bridge being concavo-spherical, and the complementary surface on said bridge fitting said spacing means being a single convexo-spherical surface coextensive with the range of adjustment of said bolt along said slot; said spacing means encircling said bolt and having clearance with respect to said bolt.

4. Clamping means for clamping articles to a support, comprising: a tension bolt having one end operatively connectible to said support; a bridge, having ends for bearing against articles to be clamped to said support; said bridge having a longitudinally elongated slot, said bolt passing through said slot; a nut for the other end of said bolt; and spacing means between said nut and bridge; said spacing means having abutment surfaces engaging complementary surfaces on said nut and bridge respectively; the surface engaging said bridge being concavo-spherical, and the complementary surface on said bridge fitting said spacing means being a single convexo-spherical surface coextensive with the range of adjustment of said bolt along said slot; the radius of curvature of said spherical surface being approximately one half of the span of said bridge; said spacing means encircling said bolt and having clearance with respect to said bolt.

ERNST GEISSBÜHLER.